United States Patent [19]

Sassano et al.

[11] 4,220,752

[45] Sep. 2, 1980

[54] METHOD OF MAKING A HIGH TEMPERATURE CAPABILITY WATER SOLUBLE POLYESTER INSULATING RESIN SOLUTION

[75] Inventors: Daniel R. Sassano, Monroeville; William H. Fink, Manor, both of Pa.

[73] Assignee: Westinghouse Electric Corp., Pittsburgh, Pa.

[21] Appl. No.: 933,334

[22] Filed: Aug. 14, 1978

[51] Int. Cl.$^2$ ............................................. C08G 63/20
[52] U.S. Cl. .......................... 528/289; 260/29.2 UA; 260/29.2 N; 260/29.2 E; 525/447; 525/448; 528/296; 528/302; 528/303; 528/486
[58] Field of Search ................. 528/289, 486; 260/850

[56] References Cited

U.S. PATENT DOCUMENTS

| 3,780,133 | 12/1973 | Kolyer et al. | 260/850 X |
| 3,835,121 | 9/1974 | Preston | 528/289 |
| 3,849,382 | 11/1974 | Nakatsuji et al. | 528/289 |
| 3,936,404 | 2/1976 | Ishizuka et al. | 260/850 X |
| 4,117,032 | 9/1978 | Kwiecinski | 528/289 X |

Primary Examiner—Wilbert J. Briggs, Sr.
Attorney, Agent, or Firm—D. P. Cillo

[57] ABSTRACT

A high temperature capability, water soluble polyester resin solution is made by esterifying an admixture comprising: an organic, aliphatic dihydric alcohol, an organic, polycarboxylic acid containing major portions of aromatic tricarboxylic acid, an organic, aliphatic dicarboxylic acid, and tris (2 hydroxy alkyl) isocyanurate; and then adding an amount of organic solvent effective to provide a solution; wherein the esterification is continued until the acid value drops to between about 35 to about 45 and wherein the mole ratio of OH/COOH=1.1 to 2.0.

3 Claims, No Drawings

METHOD OF MAKING A HIGH TEMPERATURE CAPABILITY WATER SOLUBLE POLYESTER INSULATING RESIN SOLUTION

BACKGROUND OF THE INVENTION

Polyester coating compositions in solvent form are well known in the art. Generally, these types of resin solutions pose fire and health hazards and are expensive. Curtice, in U.S. Pat. No. 3,310,512, helped solve the fire and health problems, by teaching an aqueous coating system containing a water dispersible polyester resin having a low acid value.

Curtice reacted an aromatic dicarboxylic acid, such as isophthalic acid with an aliphatic dicarboxylic acid, such as adipic acid, and at least two polyols, one of which had to be hydrophilic, to impart water dispersibility to the final resin. The hydrophilic polyol is a low carbon polyalkylene glycol, such as polyethylene glycol or polypropylene glycol. The second polyol is selected from cyclic and aliphatic polyhydric alcohols such as neopentyl glycol, trimethylene glycol, glycerine, trimethylol ethane and trimethylol propane. The ratio of dicarboxylic acid: total polyol is 1:0.95 to 1.8, i.e., OH/COOH =0.95 to 1.8, providing a neutral or basic solution.

In Curtice, all of the reactants are added together and heated in an esterification process, until the acid value drops to below 30. This water soluble polyester is then added to a 98% aqueous amine neutralizing solution, to form a polyester dispersion, having a pH of about 7. This dispersion can be cast as a wet film, dried, and baked at about 120° C., to provide flexible films having good adhesion and solvent resistance properties. These polyesters, by using a low carbon polyalkylene glycol, sacrificed high temperature properties in order to provide a water dispersible system, and could be improved in terms of even better water solubility, and improved thermal properties upon cure.

Thomas et al., U.S. Ser. No. 781,260, filed Mar. 25, 1978, U.S. Pat. No. 4,130,520, solved water solubility and thermal problems, by esterifying a highly acidic, uncatalyzed mixture of a carbocyclic dicarboxylic acid, a saturated aliphatic dicarboxylic acid, an unsaturated aliphatic dicarboxylic acid, an alicyclic dihydric alcohol, an aliphatic dihydric alcohol and a cross-linking agent, in a two step process. This provided a pH of between 8 and 9, and an acid value of between 45 and 65, with a mole ratio of OH/COOH=0.30 to 0.90. The varnish had a viscosity of about 4,000 to 20,000 cps. at 25° C., and upon cure, a cake hardness of about 80/52 Shore A at 135° C., and a coil bond strength of about 5 to 9 lb. at 100° C. this process, however, generally requires use of substantial amounts of base to adjust the pH to the desired level, adding to the cost of the varnish. The varnish could also be improved in terms of a lower viscosity, higher cake hardness, and higher coil bond strength.

SUMMARY OF THE INVENTION

The above problems are solved by providing a water soluble polyester resin solution, which contains an excess mole ratio of selected, organic, aliphatic, dihydric alcohol over organic polycarboxylic acid, the inclusion of a large percentage of aromatic materials, use of tris (2 hydroxy alkyl) isocyanurate as a cross-linking agent, and inclusion of an effective amount of catalyst for the cross-linking agent. This combination of ingredients provides a low viscosity resin varnish having good water solubility, improved flash point, and outstanding hardness and thermal properties upon cure. The reaction is continued until the acid value is between 35 and 45, and preferably there is a dual reaction sequence.

Initially, an organic, aromatic tricarboxylic acid, such as trimellitic anhydride, alone, or in combination with an organic, carbocyclic dicarboxylic acid, such as isophthalic acid is added to a hot admixture of an organic, aliphatic dihydric alochol, such as 1,2-butane diol, 1,4-butane diol, or preferably neopentyl glycol, and a cross-linking agent, such as tris (2 hydroxy alkyl) isocyanurate. A suitable catalyst for the cross-linking agent, such as small amount of a titanate is preferably also used.

The esterification process is allowed to proceed at about 150° C. to 180° C. for about 15 to 20 minutes, until the acid value drops to between about 35 to 45. Then, an organic, saturated aliphatic dicarboxylic acid, such as adipic acid, is added to provide flexibility. The esterification is continued at about 150° C. to 190° C. for about 5 hours while the acid value is maintained at between about 35 to 45.

The mole ratio of organic, aliphatic dihydric alcohol:organic, polycarboxylic acid, i.e. aromatic tricarboxylic acid plus cyclic dicarboxylic acid:aliphatic dicarboxylic acid:tris (2 hydroxy alkyl) isocyanurate is about 10:3 to 8:1 to 4:05 to 2.0. The mole ratio of polycarboxylic acid i.e., aromatic tricarboxylic plus cyclic dicarboxylic acid: alcohol is from 0.5 to 0.9:1, i.e., OH/COOH=1.1 to 2.0. This ratio does not include the isocyanurate as an alcohol.

The solids content is adjusted by the addition of first, a high boiling solvent, and then water. Melamine can be then added to additionally cross-link the polyester. The pH is adjusted down to between about 7 and 8 and the solution is made completely water soluble by the addition of a minor amount of an aliphatic organic base, such as triethanol amine or dimethylethanol amine, or an inorganic base, such as ammonia.

The formulations, having a viscosity of between about 200 cps. to 2,000 cps. at 25° C., were found to be very soluble in water. They were easily coatable and castible to form solid low temperature curable hard films. The films could be coated onto a wide variety of copper or aluminum electrical conductors or substrates, to provide an insulation having excellent heat resistance at up to 180° C., low weight loss, and outstanding high bond strength at elevated temperatures.

DESCRIPTION OF THE PREFERRED EMBODIMENTS

In the preferred method of this invention, 10 moles of organic, aliphatic dihydric alcohol is added to a reaction vessel and heated to between about 150° C. to 180° C. Then, about 0.5 to 2.0 moles of tris (2 hydroxy alkyl) isocyanurate cross-linking agent is added. After about 10 to 15 minutes, about 3 to 8 moles of an organic, polycarboxylic acid, containing a major portion of aromatic tricarboxylic acid, and an amount of catalyst effective to activate the cross-linking agent, generally about 0.04 to 0.10 wt. % of the polyester resin, is added. The mole ratio of tricarboxylic acid:dicarboxylic acid can range from 1:0 to 1, i.e., tricarboxylic acid can be used alone. The contents of the reaction vessel are reacted for about 10 to 30 minutes, and then about 1 to 4 moles of an organic, saturated aliphatic dicarboxylic acid is added. The esterification reaction is continued at about 150° C. to 190° C., for a time effective to drop the acid value to between 35 to 45, generally about 4 to about 6 hours, to form a polyester resin.

The reaction mixture is then reduced to about 40 wt.% to 65 wt.% solids, first with a suitable organic, high boiling solvent, and then with water. Generally, to 100 parts of polyester, about 10 to 20 parts of high boiling solvent and about 20 to 35 parts of water are added. The pH of the polyester solution is adjusted to between about 7 to 8, either before or after solvent addition, and the polyester is made substantially infinitely soluble in water by the addition of an effective amount of an aliphatic organic base or an inorganic base. About 5 to 15 parts of melamine per 100 parts of polyester solution is added, to provide a final, low viscosity polyester varnish, having a viscosity of between about 200 cps. to 2,000 cps. at 25° C., an OH/COOH ratio of about 1.1 to 2.0, and a solids content of between about 35 wt.% to 60 wt.%.

Suitable organic, aliphatic dihydric alcohols are selected from 1,2-butane diol; 1,4-butane diol and preferably, neopentyl glycol. These alcohols can be used alone or in mixtures. These higher carbon chain alcohols provide improved high temperature properties and hardness in the cured resin over materials such as ethylene glycol or propylene glycol. It is essential that an excess of these selected alcohols be used over acid, in this polyester system, in order to provide outstanding cake hardness and coil bond strength properties in the cured resin.

The suitable organic, aromatic tri-functional carboxylic acid is trimellitic anhydride, which is here described as an acid. Preferably this is the sole aromatic polycarboxylic acid. However, it can be used in combination with organic, carbocyclic di-functional carboxylic acids, i.e., aromatic carbocyclic types such as phthalic acid, isophthalic acid, and non-aromatic carbocyclic types, such as tetrahydrophthalic acid, and the like, their anhydrides and mixtures. The mole ratio of aromatic tricarboxylic acid:cyclic dicarboxylic acid must be between 1:0 to 1. More cyclic dicarboxylic acid than a 1:1 ratio will reduce the high temperature capability of the cured resin. The term carbocyclic is here used to mean aromatic, and aliphatic closed chain alicyclic ring structures.

Suitable organic, saturated aliphatic dicarboxylic acids include, for example, succinic acid, glutaric acid, pimelic acid, suberic acid, azelaic acid and preferably adipic acid, their anhydrides and mixtures. Preferbly, this is the sole aliphatic dicarboxylic acid. However, a minor amount of organic, unsaturated aliphatic dicarboxylic acid, such as, for example, maleic acid, fumeric acid, their anhydrides and mixtures can be used to increase the molecular weight of the resin. The mole ratio of saturated aliphatic dicarboxylic acid:unsaturated aliphatic dicarboxylic acid must be between 1:0 to 0.2, i.e. saturated aliphatic dicarboxylic acid can be used alone. More unsaturated aliphatic dicarboxylic acid than a 1:0.2 ratio will increase the molecular weight and viscosity of the polyester resin, making it less acceptable for impregnating purposes.

Useful compounds effective to help cross-linking during the esterification reaction are tris (2 hydroxy alkyl) isocyanurates, where the alkyl component is from 2 to 6 carbons, preferably tris (2 hydroxy ethyl) isocyanurate. These materials help provide outstanding hardness and bond strength properties at elevated temperatures, and are preferably used in conjunction with well-known titanate catalysts, such as for example, tetra isopropyl titanate, tetra butyl titanate, and the like. The catalyst is used in amounts effective to activate the isocyanurate material. The catalyst is generally added in a range of between about 0.04 to 0.10 wt.% of the polyester resin, not including solvent and water. Any other useful catalyst effective to activate the isocyanurate can be used. Other useful material may include tin oxides, such as tetra butyl tin oxides and the like.

Suitable organic solvents include, for example, ethylene glycol monoalkyl ethers, such as glycol monobutyl ether (butyl Cellosolve) and diethylene glycol monobutyl ether (butyl Carbitol); ethylene glycol monoalkyl acetates; ketones and glycols and their mixtures, having flash points over about 150° C. Preferred solvents are butyl Cellosolve and butyl Carbitol.

The resin solution can be diluted with a partially methylated melamine resin, effective to improve the gel time of the final solution, such as hexamethexymethyl melamine. The polyester is pH adjusted, and made completely water soluble by the addition of an effective amount of an inorganic base such as ammonia, or an organic aliphatic base such as triethanol amine; triethylamine; 2 amino-2-methyl-1 propanol, dimethylamino-2-methyl-1 propanol, dimethylethanol amine and their mixtures.

EXAMPLE

A water soluble polyester insulating resin solution was made by melting 840 grams (2.9 moles) of neopentyl glycol (organic, aliphatic dihydric alcohol) in a reaction flask with minimum inert gas sparge at 170° C., and then adding 270 grams (0.33 moles) of tris (2 hydroxyl ethyl) isocyanurate (cross-linking agent). After about 15 minutes, 648 grams (1.14 moles) of trimellitic anhydride (organic, aromatic type carbocyclic polycarboxylic acid) and 2.1 grams (0.09 wt.% of polyester solids) of tetra isopropyl titanate (isocyanurate catalyst) were added. The contents were cooked for 20 minutes to a first stage, and then 330 grams (0.81 moles) of alipic acid (organic saturated aliphatic dicarboxylic acid) was added. The esterification reaction was continued at about 165° C. for about 5 hours, until the acid value dropped to about 40, to form a polyester resin. Finally, 420 grams of butyl carbitol was added and then 840 grams of water, to reduce the solids content. About 180 grams of dimethyl ethanol amine (organic aliphatic base) was added to adjust the pH to about 7.5.

As a last step, 10 parts of 98% solids hexamethoxy methyl melamine was added per 100 parts of pH adjusted polyester solution. This provided a clear polyester resin solution having a solids content of 52 wt.%. The polyester resin solution was extremely fluid, having a viscosity of about 375 cps. at 25° C., and was found to be very soluble in water. The mole ratio of organic, aliphatic dihydric alcohol:organic, carbocyclic polycarboxylic acid:organic, aliphatic dicarboxylic acid:tris (2 hydroxy alkyl) isocyanurate was 10:3.9:2.8:1.2. The mole ratio of OH/COOH was 10/6.7=1.5.

Tests run to determine the gel time, cake hardness, bond strength on a conductor and temperature capability of the resin. The results of these tests are shown in Table 1 below:

TABLE 1

| Gel Time | Cake Hardness | Bond Strength 2 mils, 4 hrs. cure-150° C., No. 18 wire | | |
|---|---|---|---|---|
| 135° C. | 6 hr at 135° C. | 25° C. | 100° C. | 150° C. |

TABLE 1-continued

| Gel Time | Cake Hardness | Bond Strength 2 mils, 4 hrs. cure-150° C., No. 18 wire | | |
|---|---|---|---|---|
| 110 min. | 80/52 Shore A | 26 lb. | 15.5 lb. | 3.6 lb. |

This material would have a thermal rating of about 180° C. Thus, as can be seen, an extremely low viscosity polyester resin was produced. It is an excellent impregnating varnish, having good water solubility and fast gel times, with outstanding hardness and bond strength on cure. The polyester varnish was easily coated onto copper electrical conductors and cured to provide an excellent high temperature, abrasion resistant insulation.

Other materials could be substituted for those used in the example above, with equally good results, for example, 1,2 or 1,4 butane diol could be substituted for the neopentyl glycol; a di-functional carboxylic acid such as phthalic acid could be substituted for part of the tri-functional carboxylic acid as described hereinabove; other saturated aliphatic dicarboxylic acids could be used and some unsaturated aliphatic dicarboxylic acids substituted therefore, as described above. Other alkyl isocyanurates as well as their actuating catalysts could also be used.

We claim

1. A method of producing a high temperature capability polyester resinous solution which comprises admixing and esterifying a mixture consisting essentially of:
   (a) 10 moles of an organic, aliphatic dihydric alcohol selected from the group consisting of neopentyl glycol, 1,2-butane diol, 1,4-butane diol and mixtures thereof;
   (b) about 3 to 8 moles of an organic, polycarboxylic acid selected from aromatic tricarboxylic acid or mixtures thereof with carbocyclic dicarboxylic acid, wherein the mole ratio of tricarboxylic acid:dicarboxylic acid is from about 1:0 to 1;
   (c) about 1 to 4 moles of an organic, aliphatic dicarboxylic acid selected from saturated aliphatic dicarboxylic acid or mixtures thereof with unsaturated aliphatic dicarboxylic acid, wherein the mole ratio of saturated aliphatic dicarboxylic acid:unsaturated aliphatic dicarboxylic acid is from about 1:0 to 0.2;
   (d) about 0.5 to 2.0 moles of tris (2 hydroxy alkyl) isocyanurate, where alkyl contains from 2 to 6 carbon atoms; and
   (e) an effective amount of a catalyst to activate the isocyanurate; and then adding an amount of organic solvent to provide a resinous solution, wherein the esterification reaction is continued until the acid value drops to between 35 to 45, and wherein the mole ratio of OH/COOH=1.1 to 2.0.

2. The method of claim 1, wherein ingredients (a), (b), (d), and (e) are reacted until the acid value drops between about 35 to about 45 and then ingredient (c) is added, and wherein the aromatic tricarboxylic acid is trimellitic anhydride, the carbocyclic dicarboxylic acid is selected from the group consisting of phthalic acid; isophthalic acid; tetrahydrophthalic acid; their anhydrides and mixtures thereof; the saturated aliphatic dicarboxylic acid is selected from the group consisting of adipic acid; succinic acid; glutaric acid; pimelic acid; suberic acid; and azelaic acid, their anhydrides and mixtures thereof; and the unsaturated aliphatic dicarboxylic acid is selected from the group consisting of maleic acid; fumaric acid, their anhydrides and mixtures thereof.

3. A method of producing a high temperature capability polyester resinous solution, which comprises esterifying a mixture of ingredients, by the steps of:
   A) adding
      (a) 10 moles of an organic, aliphatic dihydric alcohol selected from the group consisting of neopentyl glycol, 1,2-butane diol, 1,4-butane diol and mixtures thereof;
      (b) about 3 to 8 moles of an organic polycarboxylic acid selected from aromatic tricarboxylic acid or mixtures thereof with carbocyclic dicarboxylic acid, wherein the mole ratio of tricarboxylic acid:dicarboxylic acid is from about 1:0 to 1;
      (c) about 0.5 to 2.0 moles of tris (2 hydroxy alkyl) isocyanurate, where alkyl contains from 2 to 6 carbon atoms; and
      (d) an effective amount of a catalyst to activate the isocyanurate, and then
   (B) heating the ingredients in an esterification process, until the acid value of the mixture drops to between about 35 to 45, and then
   (C) adding about 1 to 4 moles of an organic, aliphatic dicarboxylic acid selected from saturated aliphatic dicarboxylic acid or mixtures thereof with unsaturated aliphatic dicarboxylic acid, wherein the mole ratio of saturated aliphatic dicarboxylic acid:unsaturated aliphatic dicarboxylic acid is from about 1:0 to 0.2; and then
   (D) heating the ingredients in an esterification process, to form a polyester resin, wherein the mole ratio of OH/COOH=1.1 to 2.0, while maintaining the acid value at between about 35 to 45, and then
   (E) adding an amount of organic solvent effective to provide a resinous solution.

* * * * *